Aug. 7, 1934.    H. PLEW    1,969,151
REFRIGERATED TRUCK
Filed June 5, 1933

INVENTOR;
HERMAN PLEW
BY Arthur C Eckert
ATTORNEY

Patented Aug. 7, 1934

1,969,151

UNITED STATES PATENT OFFICE 1,969,151

REFRIGERATED TRUCK

Herman Plew, St. Louis, Mo.

Application June 5, 1933, Serial No. 674,379

2 Claims. (Cl. 98—2)

The object of my invention is to make a refrigerator truck, in which the necessary ventilation on the interior of the truck will be secured as economically as possible. In order to produce uniform air temperatures throughout the inside of the refrigerated truck body, it is necessary to produce a positive mechanical air circulation. In trucks of this type, either ice or refrigerating coils are positioned at one point in the truck. If no air circulation is provided, the temperature will be coldest near the refrigerating source and warmest at the greatest distance from it. By such a system, the part nearest the refrigerant may be too cold and the portion farthest from the refrigerant may be too warm. These facts have been recognized and the conventional means of producing the circulation is by means of a fan secured to the armature of an electric motor, which motor and fan are positioned on the inside of the body near the top in order to produce a circulation of the warmer lighter air and thereby force the heavier colder air upwardly until the air in the entire body is so diffused that an equality of temperature is maintained throughout the interior of the body. The current for the motor in such a system must be drawn from the battery used in connection with operating the motor of the truck. This is such a drain on the battery that it means frequent recharging of it and means frequent replacement of the battery. By the use of the method described and claimed herein, the drain on the battery is obviated.

The motion of the vehicle produces a wind circulation that strikes the front part of the body of the truck. The force of this velocity of the air is used to actuate the fan in the device herein described.

With these and other objects in view, my invention has relation to certain novel features of construction and arrangement of parts as will be hereinafter more fully described, pointed out in the claims and illustrated in the drawing, in which Fig. 1 is a front elevation of a refrigerated truck showing my device in position.

Figure 1:
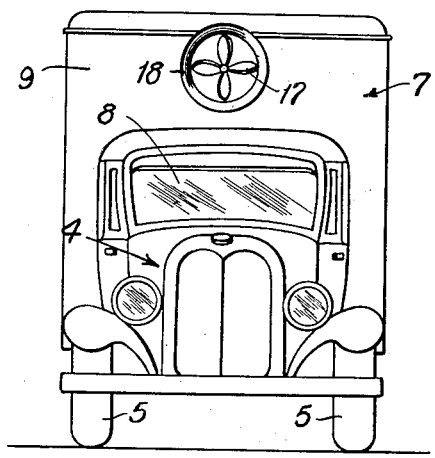

Numeral 4 designates a truck having the wheels 5, chassis 6, body 7 and driver's compartment 8. This invention concerns itself only with a circulating device attached to the body 7.

Numeral 9 designates the front wall. Numeral 10 designates the rear wall and numeral 11 the top of the body 7. The side walls are of the same construction and type as the front and rear walls. Within these walls is enclosed the refrigerating space. The walls should be properly insulated.

Figure 2:
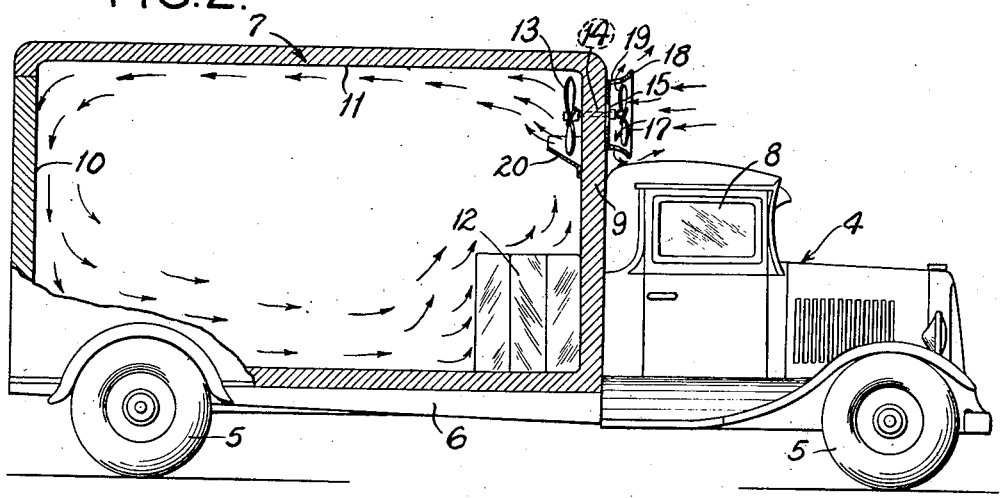
Fig. 2 is a side elevation of the truck partly in section.
Figure 3:
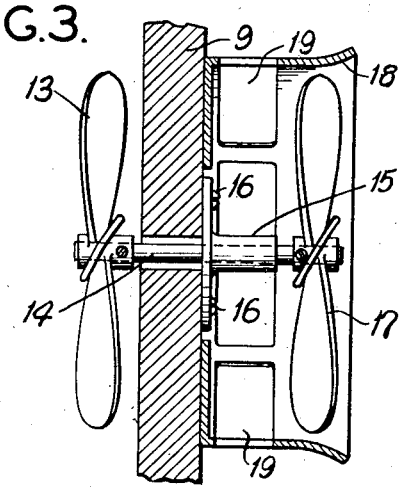
Fig. 3 is an enlarged sectional elevation of a portion of the front wall of the body and air directioning device with the fan and fan actuating means operatively positioned.

Numeral 12 designates a source of refrigeration, such as ice or brine or refrigerating coils. Numeral 13 designates a fan, which is secured to the shaft 14 in conventional manner. The shaft 14 extends through the front wall 9 horizontally above the driver's compartment 8. Numeral 15 designates a journal box for the shaft 14 secured to the front of the front wall 9 by means of the screws or other securing means 16. Numeral 17 designates an actuating or power fan, which is secured to the external end of the shaft 14 externally to the journal box 15. Numeral 18 designates an air confining and directioning element, which is cup shaped, which is secured to the front wall 9 around the base of the journal box 15. The air confining and directioning element 18 is open at its external end and of sufficient size to permit free rotation of the actuating or power fan 17. The external peripheral edge of the air confining and directioning element 18 is flared outwardly, as shown in Figs. 2 and 3. Slots 19 are cut in the lateral peripheral wall of the air confining and directioning element 18, as likewise shown in Figs. 2 and 3.

It will be seen that when the actuating or power fan 17 is rotated that the shaft 14 and hence the fan 13 will be rotated. When the truck is not moving the actuating or power fan 17 may remain stationary, unless a sufficient natural wind is blowing to rotate it. When the truck is moving forwardly, the natural wind, if any, will continue to rotate the actuating or power fan 17 and the wind or draft created by the movement of the truck will either alone actuate the actuating or power fan 17 or accelerate its rotation. The air, whether a natural wind or draft, or that produced by the movement of the truck forwardly, strikes the actuating or power fan 17 and is confined thereafter within the air confining and directioning element 18, until it is discharged through the slots 19. It will be observed that the actuating or power fan 17 is positioned at the point where it receives all of the wind power that strikes the front part of the truck. It is positioned above the driver's compartment 8 so that the wind will not be obstructed in its passage to the actuating or power fan 17. This positioning likewise is favorable for the proper distribution of the air within the truck body, by means of the fan 13. In order to deflect the air circulation, started by the fan 13, upwardly and outwardly, that is rearwardly, the deflector 20 is secured to the inner side of the front wall 9 immediately below the edge of the blades of the fan 13. The directional movement of the air within the truck body is shown by the arrows within the truck body in Fig. 2. The directional movement of the air against the actuating or power fan 17 into the air confining and directioning element 18, through the slots 19, is likewise shown by arrows.

As the speed of the truck is increased, the speed of rotation of the actuating or power fan 17 is increased. Owing to the momentum, high speeds of rotation are produced for the fan 13. Owing to this momentum, when the speed of the truck slackens the fan 13 continues to rotate and to continue its work. In fact this rotation continues for a considerable length of time, after the truck stops, particularly if it has been travelling at a fair rate of speed for any considerable length of time. It has been found that a speed as low as eight to ten miles an hour is sufficient to actuate the actuating or power fan 17 and hence the fan 13. It has also been found that in a great many instances that the natural draft or wind will be sufficient to actuate the fan 13 during the stops of the truck, but even without a natural draft or wind, the stops in trucks of this type are short and the speed between stops sufficiently great to produce a sufficiently continuous air circulation in the truck body for all practical purposes. Devices of the character described may also be placed in the side and rear walls in order to secure the benefit of any natural draft or wind in all directions against the truck body. The device is likewise not limited to use on a truck. It may be used on a conventional motor car to produce a circulation of air within a closed body, for the benefit of occupants of the closed body. It may likewise be used on stationary objects, such as buildings, for the purpose of securing the benefit of any natural air movement or draft. In such a circumstance, the device would be placed in a wall of the building just as the device illustrated has been placed in the front wall of the truck, that is to say the fan 13 would be positioned within the room and the actuating or power fan 17 on the exterior to the wall. The device can be so cheaply and easily made that its cost is nominal. For this reason, it may be duplicated in different walls of a room or different walls of a truck without excessive cost. There is no cost of operation and practically no maintenance cost. If the shaft 14 within the journal box 15 is occasionally lubricated in the conventional manner, there is practically no wear or obsolescence.

In the drawing the fan 13 and the actuating or power fan 17 are shown as substantialy the same size, but this is not a necessary condition. The actuating or power fan 17 may be larger or smaller than the fan 13, depending upon the operating conditions of the truck. The fans 13 and 17 may be made with blades of the conventional type of any desired pitch, or they may be of the blower type. Also a plurality of fans, as the actuating or power fan 17, may be secured to the shaft 14 in substantially the same position as the actuating or power fan 17.

What I claim is:

1. In combination with a wall a shaft journaled in said wall, fans secured to said shaft, one or more on each side of said wall, an air confining and directioning element secured to the outside of said wall around one of said fans, said air confining and directioning element having slots in its lateral wall and having its peripheral edges flared outwardly.

2. A truck comprising a refrigerated body and a driver's compartment, a shaft journalled in the front wall of said truck above said driver's compartment, one fan secured to said shaft externally and one secured to said shaft internally relative the front wall of said truck, said body sealed against the ingress of external air, an air confining and directioning element secured to the outside of the front wall of said truck around one of said fans, said air confining and directioning element having slots formed in its lateral wall and having its peripheral edges flared outwardly.

HERMAN PLEW.